United States Patent [19]

Hinden et al.

[11] Patent Number: 4,600,345
[45] Date of Patent: Jul. 15, 1986

[54] IMPACT FASTENER DEVICE

[75] Inventors: Milton Hinden, Glen Head; Charles Giannone, N. Babylon, both of N.Y.

[73] Assignee: Duro-Dyne Corporation, Farmingdale, N.Y.

[21] Appl. No.: 694,615

[22] Filed: Jan. 24, 1985

[51] Int. Cl.[4] .............................. F16B 15/04
[52] U.S. Cl. .................... 411/447; 411/179; 411/479; 411/495
[58] Field of Search ............... 411/179, 180, 466, 447, 411/448, 449, 450, 470, 487, 493, 495, 498, 475, 479

[56] References Cited

U.S. PATENT DOCUMENTS

| 1,841,353 | 1/1932 | Boggess | 411/475 |
| 3,095,777 | 7/1963 | Hallock | 411/501 |
| 3,133,378 | 5/1964 | Poupitch | 411/449 X |
| 4,003,286 | 1/1977 | Hallock | 411/495 |
| 4,231,280 | 11/1980 | Gross | 411/480 X |
| 4,337,287 | 6/1982 | Falkenberg | 411/475 X |

FOREIGN PATENT DOCUMENTS

| 614736 | 5/1935 | Fed. Rep. of Germany | 411/447 |
| 509032 | 1/1955 | Italy | 411/448 |
| 46-16211 | 5/1971 | Japan | 411/447 |

Primary Examiner—Thomas J. Holko
Attorney, Agent, or Firm—Mark T. Basseches; Paula T. Basseches

[57] ABSTRACT

An impact fastener especially adapted for holding batts of insulation to sheet metal is disclosed. A characterizing feature of the fastener resides in the provision of three stabilizing legs which are configured to engage the surface of the receiving metal after partial penetration and to deform in accordance with the depth of penetration, providing in all instances a stabilizing effect.

5 Claims, 5 Drawing Figures

IMPACT FASTENER DEVICE

BACKGROUND OF THE INVENTION

1. Field of the Invention

The present invention is in the field of impact devices and relates more particularly to an impact fastener device of the type employed in the air conditioning and heating fields to secure batts of insulation to the surfaces of ducts.

2. The Prior Art

It is conventional practice in air heating and cooling systems to minimize heat losses by attaching insulative material to duct components. Attachment may be effected by adhesive connections, typically supplemented by metallic fastener members extending through the insulation and secured to the underlying duct. The supplemental metallic connectors may be secured by welding, as in U.S. Pat. No. 4,482,795 of Nov. 13, 1984; U.S. Pat. No. 4,429,209 of Jan. 31, 1984; U.S. Pat. No. 3,701,874 of Oct. 31, 1972; and U.S. Pat. No. 3,624,340 of Nov. 30, 1971, by way of example.

An alternate means of attaching metallic fasteners is by way of an impact connected unit. Representative examples of such units are disclosed in U.S. Pat. No. 4,003,286 of Jan. 18, 1977 and U.S. Pat. No. 3,095,777 of July 2, 1963.

It is generally recognized that the most efficient connection is effected by welding type fasteners. Such fasteners are highly resistant to dislodgement from the metal when subjected to pulling stresses and/or to the stresses of laterally applied forces which tend to bend the fasteners.

Fasteners of the impact type heretofore known, while reasonably resistant to separating forces exerted in the direction of the axis of the attached pin, offer limited resistance to forces exerted in a direction normal to the longitudinal axis of the pin. Additionally, impact applied fasteners heretofore known over the passage of time have tended to work loose when subjected to the continuous vibration normally experienced in air ducts.

A particular shortcoming of impact fasteners of the type hereinabove set forth has resided in the fact that the stability of the fasteners is, in large measure, dependent upon the gauge or thickness of the metal in which they are secured, and the force of the impact employed in the attaching operation.

Referring more particularly to the fastener devices as set forth in U.S. Pat. Nos. 4,003,286 and 3,095,777, it will be perceived that the same are comprised of a blunt metal penetrating point which, upon impact, embeds into the metal and surrounds a ball of increment thereof. Axially spaced from the fastener point there is provided a pair of laterally extending stop portions. Where the fastener is driven into a thick gauge metal in such manner that the fastener is embedded to a depth whereat the stop portions engage the surface of the metal, a reasonably stable connection between fastener and metal is achieved at least against forces applied normal to the axis of the shank in the plane defined by the stop portions. If a force is applied normal to such plane the connection offers little resistance to stresses and the fastener will readily break free from the sheet metal.

A greater problem is confronted when an attempt is made to drive conventional impact fasteners into thin gauge metal. If, on the one hand, the fastener is driven sufficiently far that the stop portions engage against the surface of the metal, there results a complete severing by the blunt point of an increment of the metal, with resultant low resistance to a pulling force exerted on the fastener. If, on the other hand, the fastener is driven into thin sheet metal stock in such manner that the point embeds but does not puncture the metal (the desired result), the stop portions will be spaced away from the surface of the metal. An impact fastener attached in this manner, while affording reasonable resistance to removal in the direction of the axis of the fastener, affords extremely limited stability against lateral dislodging forces since the stop portions are not braced against the surface of the sheet metal.

From the foregoing it will be perceived that impact fasteners heretofore known are dependent for security of attachment on the thickness of the sheet metal to which they are secured, and it is desirable to provide a range of fasteners correlated to the thickness of the sheet metal. Additionally, the stability of known fasteners to resist laterally applied forces is highly dependent upon the force with which the fasteners are attached.

SUMMARY OF THE INVENTION

The present invention may be summarized as directed to an improved fastener of the impact type characterized in that the attached fastener evinces improved stability in the face of applied lateral forces.

A further characterizing feature of the impact fastener of the instant invention resides in the ability of the fastener to self-accommodate to a wide variety of sheet metal thicknesses so as to reduce or eliminate the necessity for supplying a variety of point configurations corresponding to the metal gauges with which the devices are to be used.

Still a further characterizing feature of the invention is the provision of an impact fastener wherein the applied fastener is highly resistant to lateral dislodging forces despite significant variations in the force of the blow used to effect attachment.

More particularly, the present invention is directed to an impact fastener including a blunt point or clinch assembly which is generally frusto-conical, the end portion including an axially directed recess. The point includes three spaced-apart slots, the slots being formed by outwardly deflecting three stabilizer legs.

A characterizing feature of the invention resides in the legs sloping outwardly from the shank and downwardly toward the plane defined by the gripper tooth portions between the slots. The stabilizer legs are angularly outwardly directed at an angle relative to the axis of the shank of about 45° to 70°, the distal ends of the legs being upwardly displaced from the ends of the gripper teeth an axial distance less than the thickness of the thinnest gauge of metal with which the device is to be used. As a result, when the device is driven into a metal sheet the point penetrates the metal and the ends of the stabilizer legs contact the metal at three points of a locus surrounding the penetration area. As the fastener progressively enters the metal, the stabilizer legs are progressively tilted outwardly.

It will thus be perceived that, unlike conventional impact fasteners, the stabilizer legs will engage and stabilize the fastener even if the fastener enters only to a light depth within the metal.

It will further be perceived that the stabilizer legs will spread progressively as the fastener is driven progressively deeper into the metal, whereby a stabilizing effect is achieved notwithstanding the depth of penetration.

Accordingly, it is an object of the invention to provide an improved impact fastener device specifically intended for holding insulation batts to sheet metal formed into or intended to be formed into ducts.

A further object of the invention is the provision of an impact fastener of the type described wherein stability against laterally applied forces is achieved regardless of the depth of penetration of the fastener.

A further object of the invention is the provision of a fastener of the type described wherein a single point size and configuration may be effectively used for attachment to ducts of a wide variety of metal thicknesses.

Still a further object of the invention is the provision of a device of the type described which is resistant to lateral forces applied in virtually any direction.

To attain these objects and such further objects as may appear herein or be hereinafter pointed out, reference is made to the accompanying drawings forming a part hereof, in which.

Figure 2:
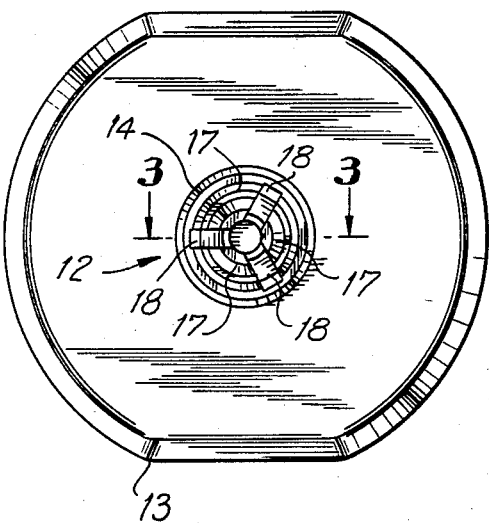
FIG. 2 is a bottom plan view of the fastener.
Figure 4:
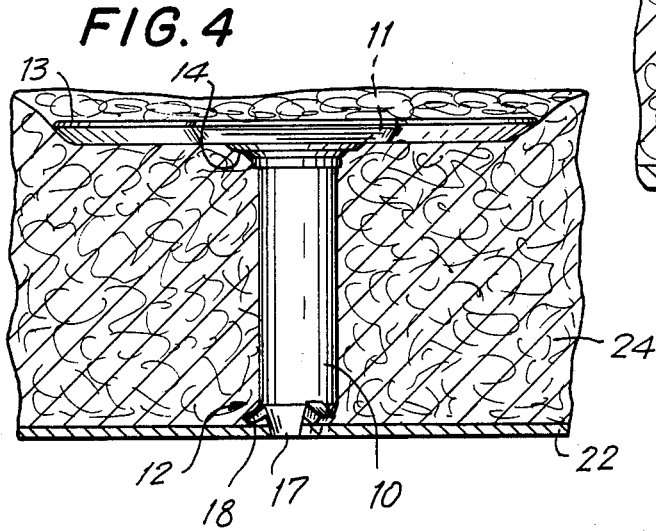
FIGS. 4 and 5 are vertical sectional views of attached impact fastener devices showing the position of the clinch assembly components with the fasteners mounted, respectively, to thin gauge and thicker gauge metal ducting.
Figure 5:
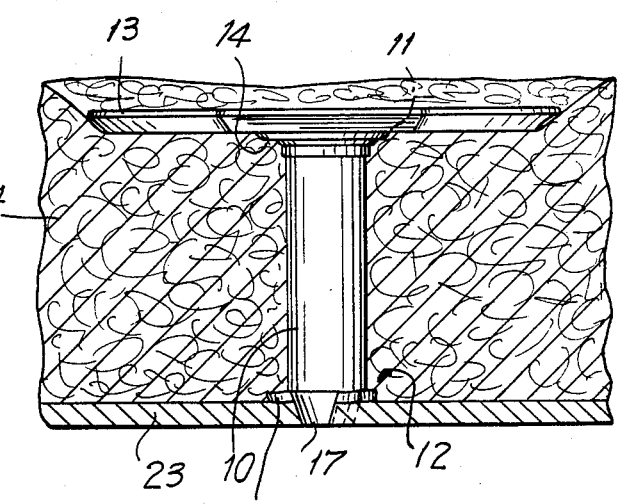

Referring now to the drawings, there is shown in FIGS. 2, 4 and 5 an impact fastener in accordance with the invention. The fastener includes a shank 10 having a driving head 11 at one end and a clinch assembly 12 at the other end. As is conventional, a washer 13 may be clampingly mounted between the driving head 11 and a shoulder 14 formed on the shank adjacent the driving end.

Figure 1:
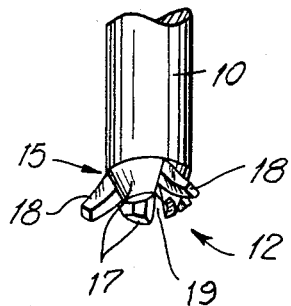
FIG. 1 is a fragmentary perspective view depicting the tip end or clinch assembly of an impact fastener in accordance with the invention.
Figure 3:
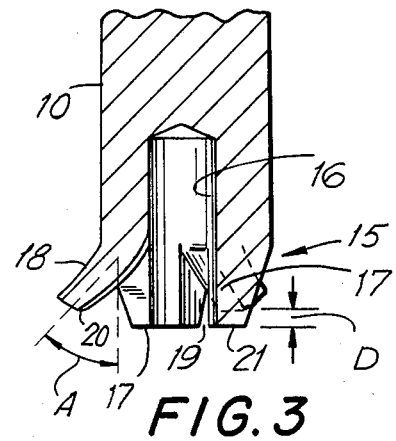
FIG. 3 is a magnified fragmentary side elevational view of the clinch assembly.

The construction of the head 11, washer 13 and shank 10 is in all respects conventional, the novelty of the instant invention residing in the configuration and construction of the clinch assembly 12, shown in detail in the fragmentary views of FIGS. 1 and 3.

The clinch assembly 12 includes a frusto-conic external wall configuration 15 having an internal, axially directed recess 16. The frusto-conic portion 15 is formed to define three gripper teeth 17 and three stabilizer legs 18.

The configuration is preferably formed by striking the stabilizer legs 18 outwardly as shown, leaving a series of three slots 19 in the areas formerly occupied by the stabilizer legs. It is important to note that the three stabilizer legs 18 are directed outwardly at an angle of from about 45° to 70° relative to the axis of the shank— that is to say, the included angle A between the axis of the shank and the central line of the stabilizer legs is in the range of about 45° to about 70° (see doted lines, FIG. 3).

As best noted from FIG. 3, the outward deflection of the stabilizer legs 18 results in the lowermost points 20 of the stabilizer legs being raised to lie in a plane above the distal ends 21 of the gripper teeth 17 by a distance D which is less than the thickness of the thinnest gauge material with which the device is intended to be used.

The device is used in the same manner as prior art impact fasteners, namely, sheet metal member 22 (thin gauge) or 23 (thicker gauge) is placed on an anvil, the shank of the fastener passed through insulation material 24, and the head 11 is struck a blow either by a manually wielded hammer, an air hammer or the like. The result of the force application is to cause the teeth 17 to embed into the body of the metal and, by virtue of the inclination of the frusto-conic formation 15, to be inwardly deflected, thereby to encompass between the three teeth 17 an increment of the sheet metal. The claw-like partial encircling of an increment of the sheet metal is what provides the fastener with resistance against axial displacement.

As the fastener is driven and immediately after entry of the teeth 17 a distance greater than the distance D, the edge portions 20 of the spacer legs 18 will be engaged against the metal surface. The angle between the legs 18 and the metal will be progressively changed in the course of the driving movements of the fastener.

When the device is used with thin sheet metal (FIG. 4), the amount of change of the included angle A will be less than is the case where the device is driven into thicker gauge metal (FIG. 5). In the latter instance the legs 18 may be bent until they lie at approximately a 90° angle relative to the axis of the shank 10.

It is important to note that regardless of the thickness of the metal 22 or 23, there is achieved with the present fastener a contact between the tips of stabilizer legs 18 and the upper surface of the metal. Thus, while the angle described between the legs 18 and shank may vary in accordance with the driving depth of the fastener, there is at all times a stabilizing contact between the tips of each of the legs and the metal surface. In this manner, and by virtue of the tripod conformation of the fastener, it will be seen that the attached device is resistant to lateral forces applied in any direction.

It will be perceived that the stabilizing force will be achieved regardless of the depth to which the fastener is driven. By way of example, if the fastener is not driven to the full depth shown in FIG. 5, it will be recognized that the legs 18 may be bent to less than a 90° angle. Such incomplete driving of the fastener may result in some compromise of the resistance of the fastener to dislocation in an axial direction but will nonetheless provide a substantial resistance to laterally applied destabilizing forces.

It will be further noted that when the fastener is driven in such manner that the legs are flattened against the surface of the sheet metal (FIG. 5), the same act as stops against further driving movement. Also, the stabilizer legs function, to a degree, to assure that the fastener is driven in a direction close to perpendicular to the sheet metal. This "righting" action occurs due to the contact of the stabilizer legs prior to full embedment of the fastener.

As will be readily recognized from the above description, the device of the instant invention provides a more stable connection, particularly against laterally applied forces, than impact fasteners heretofore known, as represented by the previously cited U.S. patent references.

By providing stabilizer legs extending substantially 120° apart, the fastener is resistant to lateral forces exerted in any direction. Importantly, the stabilizer legs engage against the metal surface at least to some degree independently of the depth to which the fastener is driven and thus provide significant stability. In contrast, in the prior art devices no stabilizing effect whatever is achieved unless the fastener is driven to a depth in which the two stop portions abut the sheet metal.

It will thus be seen that if the known impact fastener is used with a thin gauge metal duct, the point must penetrate entirely through the duct to bring the stop portion into contact with the duct surface, an action which results in air leak and weakening of axial connection due to separation of the enveloped metal from the body of the sheet. If the prior art device is driven to a depth to avoid complete piercing and thus maximize actual connection, the stop portions may be spaced from the surface of the duct and the fastener will evince very limited resistance to dislodging forces.

As a skilled worker familiar with prior art impact fasteners will readily recognize, maximum effectiveness of such fasteners can be achieved only if the point sizes of such fasteners are closely correlated to the metal gauge which is to be employed, such that the stop portions engage the metal surface prior to piercing of the metal. In contrast, the device of the instant invention provides stabilizing action notwithstanding the gauge of the metal with which the fastener is used and notwithstanding the fastener being under-driven.

A surprising and unexpected further advantage of the fasteners in accordance with the invention resides in their increased resistance to removal in an axial direction. Tests of conventional impact fasteners against fasteners of the instant invention have uniformly evinced an approximate increase of resistance to pulling forces of the applied fasteners of approximately 20 to 35%.

As will be apparent to those skilled in the art and familiarized with the instant disclosure, numerous variations in details of construction may be made without departing from the spirit of the present invention. Accordingly the same is to be broadly construed within the scope of the appended claims.

Having thus described the invention and illustrated its use, what is claimed as new and is desired to be secured by Letters Patent is:

1. As a new article of manufacture, a tilt resistant impact fastener for attaching insulative material to sheet metal comprising, in combination, a cylindrical shank having a driving head at one end and a penetrating clinch assembly at the other end, said clinch assembly comprising a generally frusto-conical external wall configuration tapered inwardly toward the axis of said shank, the end portion of said clinch assembly defining an axially directd recess, said frusto-conical portion including three angularly spaced-apart slots extending axially within said configuration, said slots being spaced apart substantialy 120°, thereby to define three gripper teeth, the end portions of said gripper teeth being blunt and disposed in coplanar alignment, a stabilizer leg formed in said configuration between each pair of said teeth, said stabilizer legs including distal portions disposed in a plane closer to said head than the plane of said gripper teeth, the inner and outer surfaces of said stabilizer legs sloping outwardly from said shank and downwardly toward the plane defined by the ends of said teeth, said stabilizer legs being positioned to be radially outwardly deflected responsive to axial pressure exerted against the distal ends thereof in the direction of said head.

2. An impact fastener in accordance with claim 1 wherein the plane defined by the ends of said teeth extends beyond the plane defined by the distal ends of said stabilizer legs by a distance smaller than the thinnest gauge of sheet metal to which said fastener is to be attached.

3. An impact fastener in accordance with claim 2 wherein said stabilizer legs are connected to said fastener at a root portion substantially coincident with the junction of said shank and said frusto-conical configuration.

4. A fastener in accordance with claim 3 wherein the axial extent of said frusto-conical configuration is substantially equal to the maximum thickness of sheet metal to which said fastener is to be attached.

5. A fastener in accordance with claim 1 wherein the included angle between said stabilizer legs and the axis of said shank is in excess of 45° and less than about 70°.

* * * * *